Patented Nov. 24, 1953

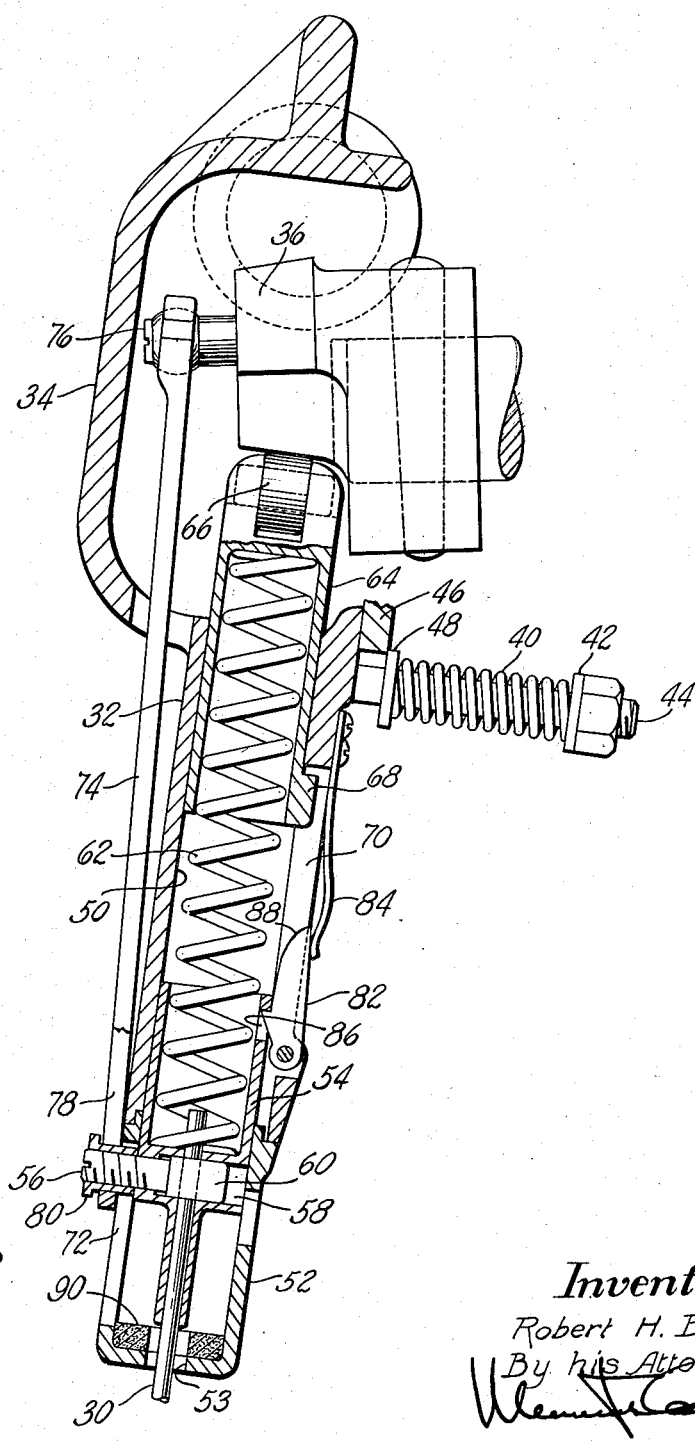

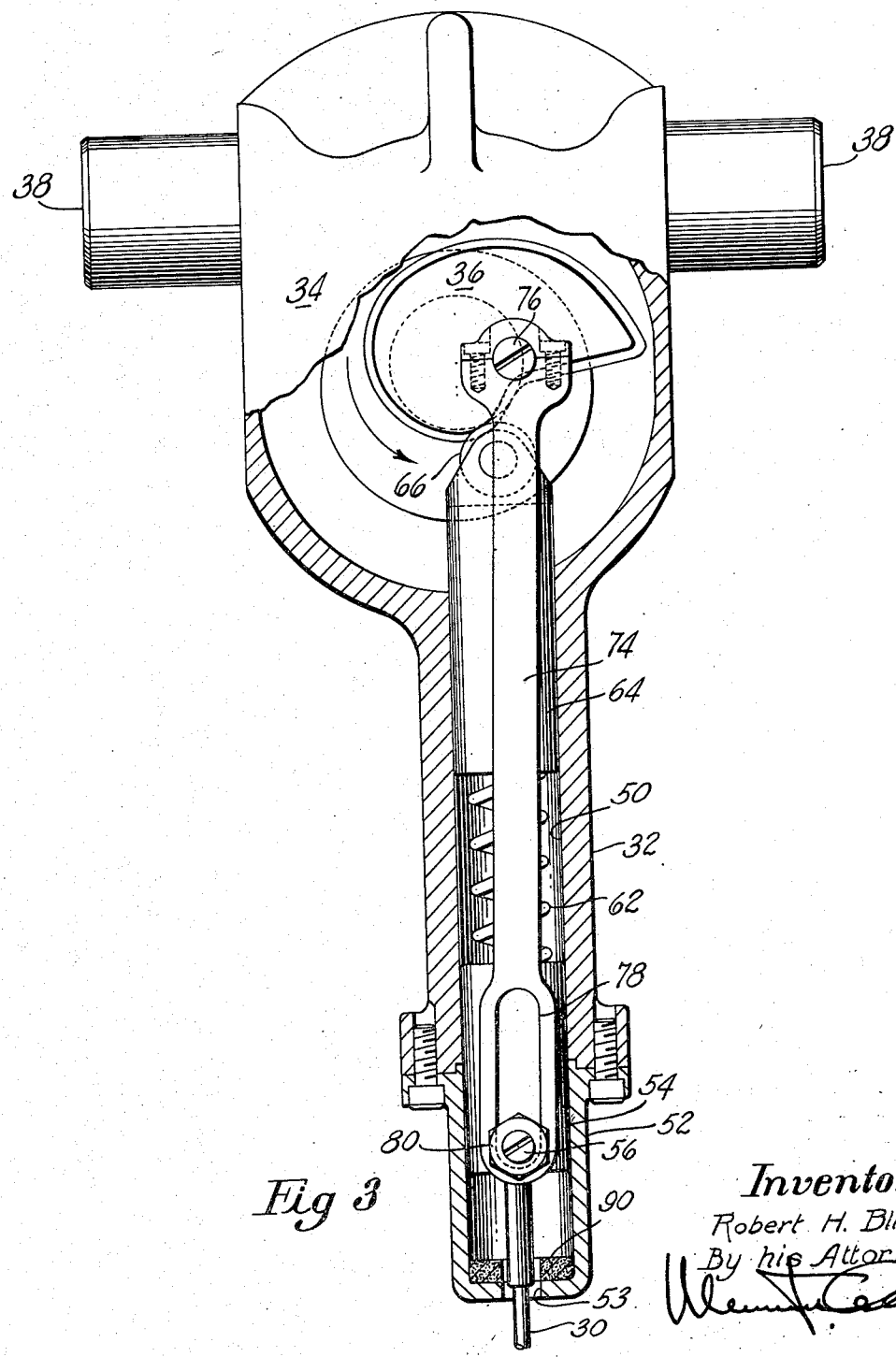

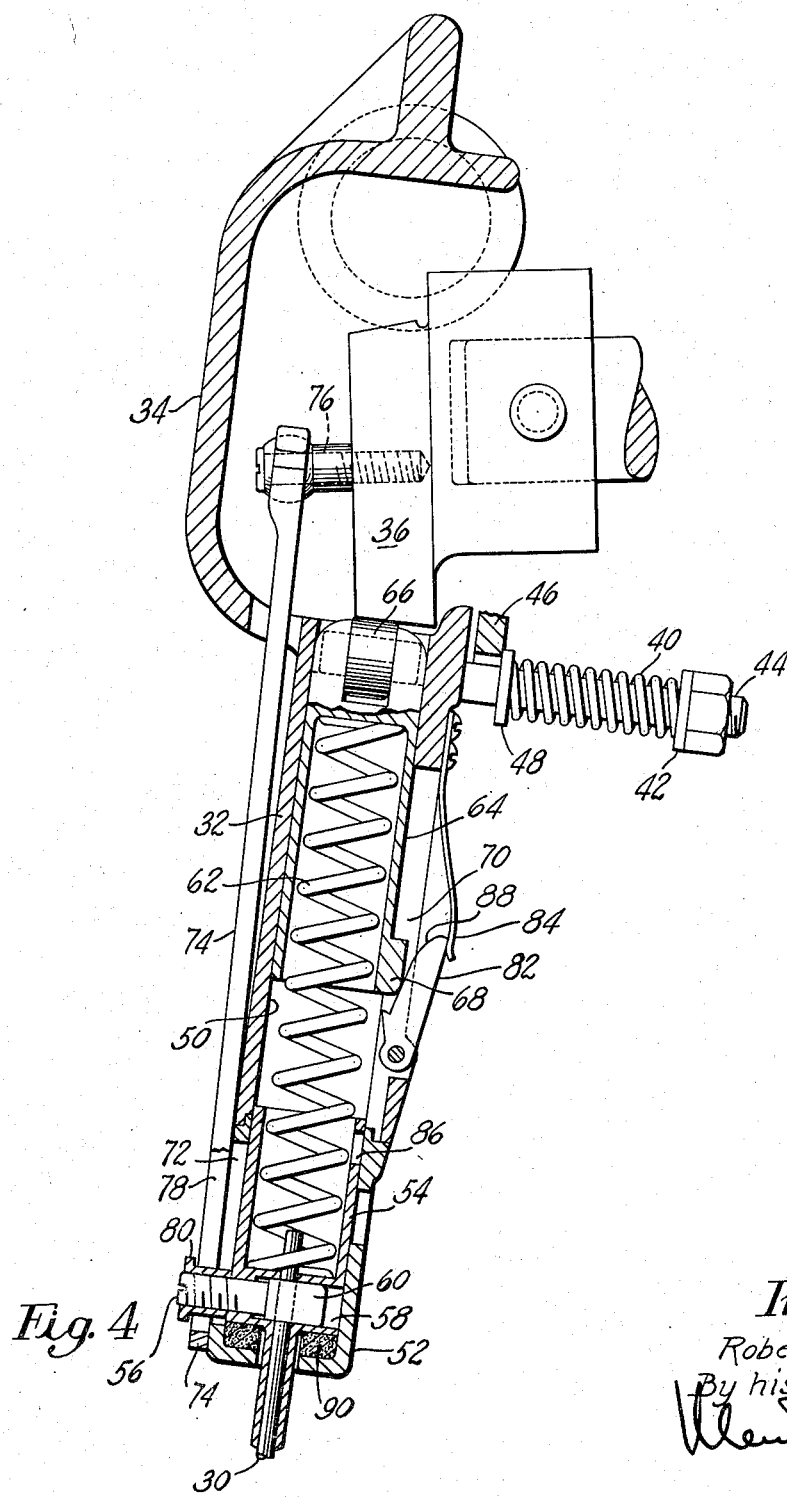

2,659,886

UNITED STATES PATENT OFFICE 2,659,886

FASTENER INSERTING MECHANISM

Robert H. Bliss, Beverly, Mass., assignor to United Shoe Machinery Corporation, Flemington, N. J., a corporation of New Jersey Application March 4, 1952, Serial No. 274,743

9 Claims. (Cl. 1—18)

This invention relates to machines for driving tacks and particularly to a novel and improved mechanism for operating a power-driven tack driver. Although the herein illustrated embodiment of the invention is shown as applied to a shoe lasting machine of the so-called hand method type, it will be understood, of course, that the tack driving mechanism of this invention is of broader utility and, therefore, not limited to use either in a shoe lasting machine or in a machine of the exact mechanical construction shown.

A well-known type of tack driving apparatus, in common use today, is substantially the same as that shown in United States Letters Patent No. 584,744, issued on June 15, 1897, in the names of Ladd and McFeely. As therein disclosed the mechanism, for driving a tack from the tack controlling fingers through the tack nozzle and into the work, comprises a sturdy reciprocating driver bar the upper end of which is movably linked by a thrust bar to a driving lever arm extending perpendicularly outward from the longitudinal midsection of a heavy torsion rod or spring which is loaded as always to exert a strong downward driving force upon the thrust and driver bars, which bars are first cocked against the force of the spring, and then tripped or fired by a power-driven cam acting directly beneath a shoulder on the driver bar. To prevent the forceful descent of this massive driver mechanism from driving the head of the fastening too deeply into or through the work, the downward stroke of the driver customarily is limited by a resilient impact-absorbing element which cushions the drive and generally is adjusted so as to have arrested completely the driving stroke by the time the face of the driver has reached a position about one-eighth of an inch beneath the tack nozzle.

While driving mechanisms of the above-described general type have been used with acceptance for a great many years, they have been quite noisy, and, when used upon hand-held work, have caused considerable fatigue in the operator's hands. Both of these objectionable features are known to be attributable to the great number and heavy mass of the moving parts required for thus actuating the driver; however, it has not been found feasible to reduce the mass of these parts, due to the excessive wear and abuse to which they are subjected during the operation of such a type construction.

These numerous heavy parts, in addition to being costly to manufacture, are so located by necessity as to increase greatly the height and overhang of the machine, thus making it more space-consuming, unattractive and potentially dangerous; the latter condition being due to the exposed outer location of these powerfully moving parts.

Foremost among the objections to the foregoing driving mechanism is its inability to set the tack "home" in accordance with best tack driving principles, i. e. to drive with a very high, non-decelerating, velocity throughout the entire stroke, until the head of the fastening is home, and then to stop the movement of the driver almost instantaneously, to avoid its overcarrying and thereby driving the fastening too deeply into the workpiece. On the contrary, the above-described construction is so powerful and massive that to arrest its driving motion, without destructive impact and attendant additional noise, requires the employment of a resilient bumper of substantial thickness, such that the moving masses may be more gradually brought to rest; also, to avoid overdriving the head of the fastening, this bumper must be disposed so as initially to engage the descending driving elements a considerable time before the fastening has been driven completely home. This expediency causes a relatively long terminal movement of the driver characterized by a marked deceleration which not only produces a "mushy" drive that frequently fails to set the fastening home, but, due to the greatly decreased velocity during the final phase of this movement of the driver, also allows the operator's hands to absorb a considerable portion of the stopping impact which, had the driver been faster, would have been absorbed to a large extent by the inertia residing in the mass of the last and shoe.

Further undesirable features, of the Ladd et al. type machine, are the excess wear and noise caused by the upward cocking movement of the driver against the force of the strong spring, and also, upon stopping the machine, the driver remains cocked while in idle position with the entire mechanism under stress and ready to be fired.

It is an object of the present invention to provide a novel and improved fastening inserting mechanism which, in addition to other advantages, has a much faster and non-decelerating driver stroke right up to the point of setting the fastening home, and which may then be brought to rest quickly and quietly without causing any appreciable impact reaction upon the hands of the operator. To this end, and in accordance with a feature of the invention, the moving parts accompanying the operational strokes of the driver have been reduced to a minimum in number, degree of movement and weight. In order to compensate for the kinetic driving energy, which otherwise might be lost because of this diminution of the moving mass, the velocity of the driving stroke has been greatly increased, so that, instead of the fastening being inserted by a massive but relatively slow-moving driving force as previously employed, the fastening is inserted, in accordance with the present invention, with a very high velocity by a mass of only about one-tenth the weight of the prior driving mass. Since the energy produced is proportional to the mass and the square of the velocity, in order that the lighter driver mechanism have the same driving potential, it is only necessary in this instance to increase the velocity by $\sqrt{10}$, or by 3.1. Although the driving force deliverable by this lightweight mechanism is equivalent in potential kinetic energy to that of the far heavier old type driver mechanism, its lighter mass may be completely arrested in downward movement within but a fraction of the distance previously required and without dissipating as much of the driver energy. This very advantageous feature is accomplished in part by the employment of a wafer-like resilient bumper instead of the thick bumper which was previously required, and in part by the fact that the driving stroke of this light driver is so fast, and its mass so light, that the much greater mass inertia inherent in the weight of the last and shoe may be utilized to assist in stopping the driver without affording an opportunity for any appreciable reaction movement being imparted to the work and thus transmitted to the operator's hands. Another factor, influencing the ability suddenly to stop this novel mechanism, is that the quick arresting action of the thin bumper unit may be timed so as to coincide with the peak resistance operating upon the face of the driver as a result of the head of the fastening being driven home against the surface of the work. Thus it may be seen that in accordance with this invention the driver may be quickly brought to rest at the desired time as the result of its driving energy being completely absorbed by the concurrent combined action of the thin bumper and the resistance to further insertion of the head of the fastening, which latter resistance, due to the speed of the drive, is almost completely expended in the mass inertia of the workpiece itself.

A feature materially contributing to the advantageous operation of applicant's mechanism is the novel construction which enables the driver to be completely reset to its elevated position while the driving spring is unloaded. Besides effecting a material saving by reducing wear upon the parts, this advantage is also associated with another feature: that in the inoperative or at rest position of the machine the driver spring is not cocked although the driver itself has been reset and is latched in elevated position so as not to interfere with the free movement of the work. Finally, the entire driver operating mechanism has been constructed and arranged so as to be self-contained within a small protected assembly which may be cheaply manufactured and which, as hereinafter described, is located on the machine in a position wherein it is afforded little likelihood of causing injury to the operator. The consolidation of all the driver operating mechanism within this small compact assembly not only greatly adds to the good appearance of the machine, but also materially reduces its over-all dimensions, thus effecting a substantial saving in operating space.

According to the present invention the novel driver operating mechanism, except for a resetting link, is encased within a tubular housing supported upon the machine frame so as to extend downward from beneath a power driven cam which actuates the mechanism. The main operating parts consist of a driver operating compression spring nested between two sleeve-like plungers, one above the other. The upper, or cocking, plunger is moved downward by the actuating cam to compress this spring against the other plunger which, at the time, is latched in its elevated position. Movement of the cocking plunger to its downwardmost position releases a latch which allows the lower, or driving, plunger to fly downward under the impetus of the cocked spring. The driver rod is fastened to this lower plunger, so that when the latch is tripped, by the completed movement of the cocking plunger, the driver is released and impelled by the spring until the driving plunger bottoms against a bumper. A reset link, attached to the lower or driving plunger by a lost motion connection, is then elevated by an eccentric connection on the actuating cam to raise the driver and driving plunger into reset position where this lower plunger is once more engaged by the latch. Due to the fact that the actuating cam, prior to the resetting of the driver, has rotated as to permit the cocking plunger to be freely raised, this resetting of the driver may be effected without compressing the spring which merely rises with the driving plunger pushing the cocking plunger upward ahead of it until the whole mechanism is reset and the cocking plunger once more engages the actuating cam preparatory to another operating cycle during the spring-compressing phase of which the reset link descends to get out of the way of the succeeding driving stroke.

The above and other objects and features of this invention will appear from the following detailed description of the preferred embodiment thereof illustrated in the accompanying drawings, and will be pointed out in the claims.

In the drawings,

Fig. 2 is a right side elevation partially in cross section and broken away illustrating the driver operating mechanism in its inoperative or reset position;

Fig. 3 is a front elevation of the mechanism partially broken away and in section as viewed just prior to the completion of the resetting operation; and Fig. 4 is a view similar to that of Fig. 2 but showing the mechanism at the completion of its driving operation.

Figure 1:
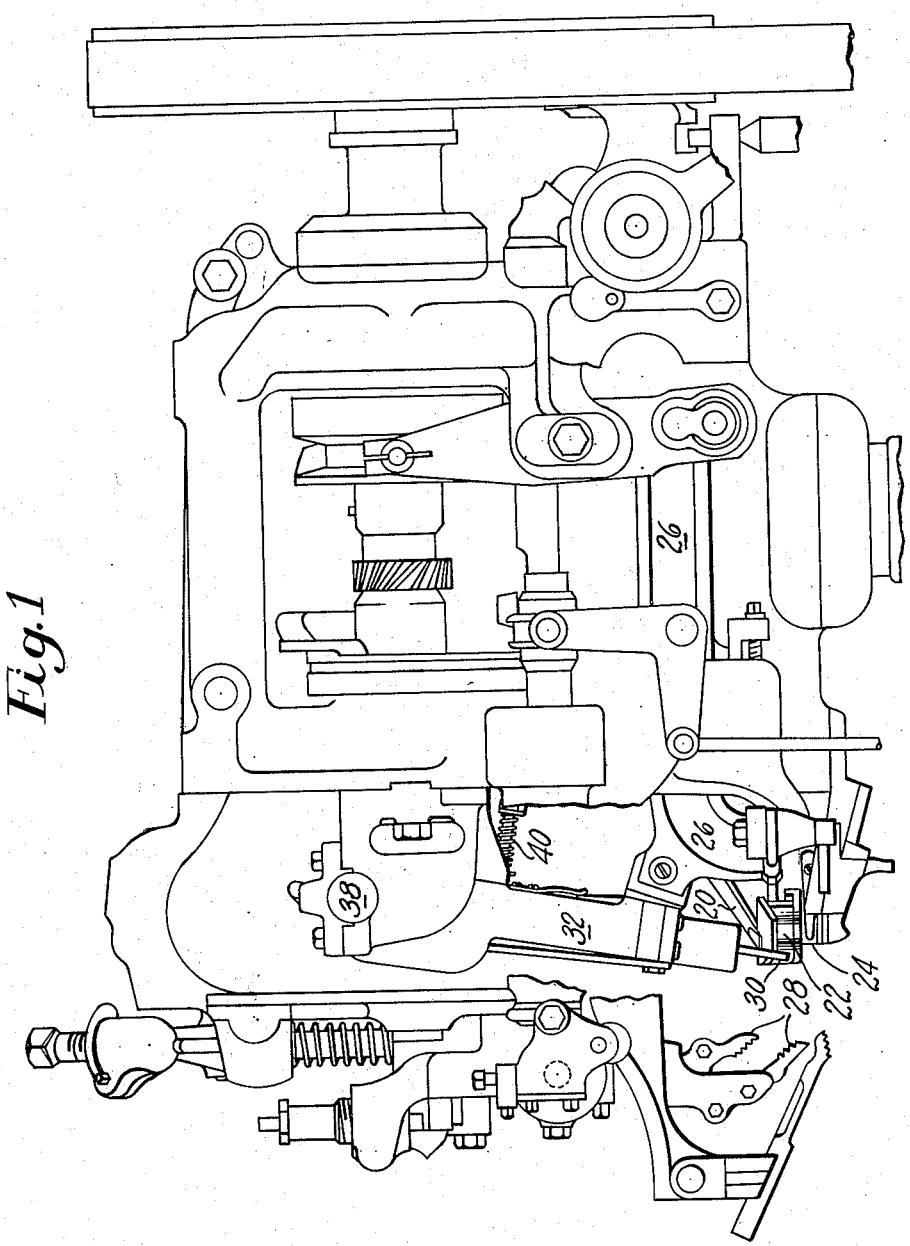
Fig. 1 is a right side elevation of a lasting machine having portions thereof broken away to show the manner in which the driver operating mechanism of the present invention is adapted to the machine.

Referring to these drawings and particularly to Fig. 1, the improved driver operating mechanism of this invention is therein illustrated as applied to a so-called "hand method" lasting machine of the type illustrated in the Letters Patent No. 584,744, before mentioned, as modified in some respects in the manner shown in United States Letters Patent No. 999,233, issued August 1, 1911, in the names of Ladd and Stiggins. In common with lasting machines of this type, the herein illustrated machine is provided with a raceway 20 for conducting tacks to a tack separating mechanism 22, which is actuated to pick a tack from the lower end of the raceway and allow the tack to fall by gravity into the tack holder of a carrier block 24, attached to the forward end of a horizontally reciprocating slide member 26, which moves in timed relation to the operation of the lasting pincers 28, to transport the separated tack from a retracted tack-receiving position to a forward tack-driving position above the workpiece. As illustrated in Fig. 1, the slide 26 and block 24 are in retracted position to receive a tack to be subsequently driven by a tack driver 30. The manner in which the axis of the driver 30 is also retracted rearwardly in the machine to avoid interference with the operation of the lasting pincers, and the manner in which its axis is subsequently restored to its forward driving position in alinement with the tack holder of the carrier block 24, are well understood in the art and, since these operations do not constitute a part of the present invention, they will not be described further or mentioned hereafter except as necessarily incidental to the following detailed description of the construction and operation of the novel driver operating mechanism.

As will be seen from the drawings, the driver operating mechanism of the present invention is contained within a tubular housing 32 provided with an enlarged head portion 34 adapted to accommodate an actuating cam 36 affixed to a power driven shaft on the machine. The housing is pivotally mounted, for limited movement within a vertical plane, by trunnion pins 38 suitably journaled within a stationary portion of the machine frame. The housing normally is urged rearwardly in the machine (as shown in Fig. 2) by the force of a compression spring 40 nested between two face washers, one of said washers 42 being fixed on the rearward end of a stud 44, secured to the housing and extending rearwardly beyond an adjacent portion 46 of the machine frame, the other washer 48 being slidable on the stud and arranged to abut against the rear of the frame portion 46, so that the force of the spring 40 will tend to retract the lower end of the housing to a rearward position, while yieldingly permitting the driver and the housing to be pivoted at times slightly forward in the machine, which, as above mentioned, is necessary to establish the axis of the driver 30 in proper relation to the workpiece before driving a tack. The interior walls of the housing portion 32 are machined to form a plunger guideway 50 within which the main components of the driver operating mechanism are slidably arranged. In the illustrative embodiment of the invention, the lower extremity of the housing preferably is formed as a separate and removable nose piece 52, Fig. 3, to provide ready access to the operating parts within the housing. The driver 30 extends through a central opening 53 in the bottom of the nose piece, and the upper extent of the driver is rigidly clamped to a driving plunger 54 by suitable means, such as a binding block 60 having a threaded rod 56 extending outward from a slide passage 58 formed laterally through the bottom portion of the plunger 54, so as to lock the driver to the plunger by a transverse force applied to the binding block 60 when a threaded retainer bushing 80 is drawn tightly against the side of the plunger. The upper portion of the driving plunger 54 is in the form of a sleeve or cup within which is nested the lower end of a main driver operating spring 62. The upper end of this spring is similarly nested within the cup of a sleeve-like cocking plunger 64 provided at its outer upper extremity with a cam follower roll 66, bearing against the power driven cam 36. The axis of the roll 66 is maintained in the same vertical plane with that of the cam 36 by an ear 68, affixed to the outer sleeve portion of the cocking plunger 64, and extending outward into a longitudinal slot 70 cut through the rear wall of the tubular housing. Thus, while the ear 68 acts as a key to prevent any rotary movement of the cocking plunger which movement might otherwise cause a misalined contact between the pressure surfaces of the cam 36 and its follower roll 66, it does not prevent the reciprocal heightwise operation of the plunger 64 in response to the opposing forces of the cam 36 and spring 62.

Before relating the manner in which the downward driving operation of the driving plunger 54 is effected, the following description will be given pertaining to the construction and operation by which the driver with its plunger 54 are elevated to their "at rest" or reset positions, as illustrated in Fig. 2. The previously described rod 56, employed to lock the driver to the plunger 54, is also employed as a means for imparting upward movement to the driving plunger. As may be seen from the illustrations, this threaded rod 56 extends outward through a heightwise slot 72 cut through the front wall of the housing nose piece 52, thus providing a convenient means for attaching an external reset link 74 to the driving plunger within the housing. The upper end of this reset link is connected by a universal ball coupling to a crank pin 76 axially secured in an eccentric posiiton on the forward face of the cam 36. The lower end of the link 74 is attached to the outer extent of the rod 56 by a lost motion coupling comprising a longitudinal slot 78, adjacent the lower end of the reset link, providing a slideway for the reception of the retainer bushing 80 threaded onto the outer end of the rod 56, and having an outer flange for retaining the rod and bushing within the confines of the slot 78. In addition to maintaining the reset link 74 connected with the rod 56, the bushing 80, as previously mentioned, serves as a drawnut firmly to secure the driver to the plunger 54. From the foregoing it will be apparent that upward movement of the link 74 will draw the driving plunger upward from the fired position of Fig. 4 to the reset position of Fig. 2, in which latter position the plunger is retained, even after the descent of the link, by a spring pressed latch 82, pivotally mounted within the lower portion of the longitudinal slot 70. This latch 82 has a detent which, when the plunger 54 reaches its reset position, is moved by a spring 84 into latching engagement with an opening in the upper sleeve portion of the driving plunger. Since the stationary latch 82 and the sliding ear 68, attached to the sleeve of the cocking plunger, are both vertically alined with one another within the slot 70, continued downward movement of the cocking plunger, as occurs during the cocking or compression of the spring 62, will bring the ear 68 to bear against a camming surface 88 on the forward edge of the latch, thus causing the latching detent to be pivoted out of engagement with the driving plunger and thereby releasing the plunger to the downward driving force of the spring 62.

The operation of the tack driving mechanism of the present invention, commencing with the "at rest" or inoperative phase of the machine, is as follows: Referring to Fig. 2, it will be noted that in this operational phase the driver and its driving plunger 54 are latched in their fully elevated positions by the engagement of the detent on the latch 82 with the sleeve of the driving plunger. During this phase the actuating cam 36, which rotates counterclockwise as viewed from the front of the machine, is disposed in its uppermost position, so that little if any downward compression is at this time imparted to the spring 62, even though the lower end of this spring has been raised to its uppermost position by the aforedescribed lifting action of the reset link 74 which, as viewed in Fig. 2, is also at its uppermost extent of travel. As the power driven cam 36 commences its movement toward its position as shown in Fig. 4, the downward force exerted against the roll 66 progressively depresses the cocking plunger 64 thereby forcefully compressing the spring 62 against the driving plunger 54 which it latched in its raised position. During this downward compression of the spring 62, and before the ear 68 has been moved into contact with the latch release element 82, the said movement of the cam 36 acting through its crank pin 76 returns the reset link to its lowermost position, so that the retainer bushing 80 is then positioned within the top portion of the lost motion slot 78. Thus the driving plunger 54 now is only supported against the downward pressure of the operating spring 62 by the engagement of the latch 82. Simultaneously with the link 74 reaching its position as illustrated in Fig. 4, the ear 68, which has meanwhile been lowered against the camming surface 88, pivotally releases the detent supporting the plunger 54 allowing the spring 62 to impel the plunger 54 and driver 30 downward at right velocity until the plunger bottoms against a thin resilient bumper 90 in the bottom of the nose piece 52. Continued rotation of the crank pin 76, carried by the cam 36, raises the plunger 54 and the driver to their elevated positions in which they once more become latched in reset position. It will be observed from Fig. 3, which represents the relative position of the various parts toward the completion of the resetting operation, that those sectors of the cam 36 which contact the roll 66 during the elevation of the spring 62 are sufficiently relieved to allow the cocking plunger 64 to rise with the spring thereby avoiding compression of the spring during the resetting operation.

Having described the invention, what is claimed now as new and desired to be secured by Letters Patent of the United States is:

1. A fastener driving mechanism comprising a housing, an upright guideway formed on the interior walls of the housing, a cocking plunger mounted in the upper portion of the guideway, a driving plunger mounted in the lower portion of the guideway, a spring nested between said plungers tending to force them apart, a latch engageable with the driving plunger for normally holding that plunger inoperative in an elevated position, power actuated means engageable with the cocking plunger for depressing it against the action of the spring while the driving plunger is latched, latch release means including a member carried by the cocking plunger for actuating the latch to release the driving plunger after the spring has been compressed, a resilient wafer-like bumper affixed at the lower end of the guideway so as to engage the driving plunger at the end of its driving stroke to arrest its movement, a reset link provided with a lost motion connection to the driving plunger, and means for raising the link and driving plunger while the power actuated means is disengaged from the cocking plunger and while the upward movement of the spring is unrestrained whereby the plungers and spring are elevated concomitantly to their inoperative position without effecting a compression of the spring.

2. In a fastening inserting machine of the type described having a power-driven rotary shaft, a driver operating mechanism comprising a housing, a cocking plunger and a driving plunger each mounted within said housing for reciprocal movement toward and away from each other, a compression spring nested between said plungers tending to force them apart, a latch engageable with the driving plunger for normally holding that plunger inoperative in an elevated position, a cam affixed to the rotary shaft and engageable with the cocking plunger to depress said plunger toward the driving plunger against the action of the spring while the driving plunger is in latched position, latch release means operable by the depression of the cocking plunger to unlatch the driving plunger after the spring has been compressed, a resilient bumper affixed within the lower end of the housing so that the descending driving plunger engages the bumper near the end of its driving stroke to arrest its movement, and means for resetting the driver operating mechanism while the cam is disengaged from the cocking plunger whereby the plungers and spring are elevated concomitantly to their inoperative position without effecting a compression of the spring.

3. A machine such as claim 2 wherein the means for resetting the driver operating mechanism includes a power-driven reciprocating link connected through a lost motion coupling to the driving plunger, said means being operatively timed with respect to the rotation of the cam so that during the upward resetting movement of the link the cam is disengaged from the cocking plunger and so that the link descends out of the way of the succeeding driving stroke before the cam has completed its spring compressing movement.

4. In a fastening inserting machine of the type described having a power-driven rotary shaft, a driver operating mechanism comprising a housing, a cocking plunger and a driving plunger each mounted within said housing for reciprocal movement toward and away from each other, a compression spring nested between said plungers tending to force them apart, a latch engageable with the driving plunger for normally holding that plunger inoperative in an elevated position, a cam affixed to the rotary shaft and engageable with the cocking plunger to depress said plunger toward the driving plunger against the action of the spring while the driving plunger is in latched position, latch release means operable by the depression of the cocking plunger to unlatch the driving plunger after the spring has been compressed, a resilient bumper affixed within the lower end of the housing so that the descending driving plunger engages the bumper near the end of its driving stroke to arrest its movement, and means for resetting the driver operating mechanism while the cam is disengaged from the cocking plunger whereby the plungers and spring are elevated concomitantly to their inoperative position without effecting a compression of the spring, said means including a link having one end connected by a lost motion coupling to the driving plunger and the other end attached to a crank pin on the rotary shaft.

5. In a fastening inserting machine of the type described having a power-driven rotary shaft provided with a cam and a crank pin for actuating a driver operating mechanism, an elongated housing extending beneath said cam, a compression spring nested within said housing between an upper cocking plunger and a lower driving plunger, a roller on the cocking plunger engageable with the cam for depressing the plunger to cock the spring, a reciprocating reset link having its lower end connected to the driving plunger by a lost motion coupling and its upper end connected to the crank pin whereby the driving plunger may be raised, a latch engageable with the driving plunger to hold the plunger in raised position after the descent of said link, and latch release means including a member carried by the cocking plunger, said cam and crank pin being constructed and arranged to operate in time relation to each other so that during the raising of the link and driving plunger the cam is disengaged from the roller whereby the plungers and spring are reset to elevated position without effecting a compression of the spring.

6. A fastener driving mechanism comprising a cocking plunger, a driving plunger, a spring acting between said plungers tending to force them apart, a releasable latch engageable with the driving plunger for normally holding that plunger inoperative in an elevated position, power actuated means engageable with the cocking plunger for depressing it against the action of the spring while the driving plunger is latched thereby to load the spring, latch release means operable by the cocking plunger to release the driving plunger after the spring has been loaded, and additional means for elevating the driving plunger while the power actuated means is disengaged from the cocking plunger whereby the plungers and spring may be elevated concomitantly to their inoperative position without effecting a loading of the spring.

7. In a fastener inserting machine provided with a power-driven rotary shaft, a driver operating mechanism comprising a cocking plunger and a driver operating plunger each reciprocally movable toward and away from each other, a spring acting between said plungers and tending to force them apart, a reciprocating link actuated by said shaft and connected through a lost motion coupling to the driver operating plunger so that when moving in one direction the link retracts the driver operating plunger to a reset position, a releasable latch engageable with the driver operating plunger to hold the plunger in reset position while the link is moving in the opposite direction, means operatively engageable with the cocking plunger to move that plunger toward the driver operating plunger thereby to load the spring, said means also being actuated by the rotary shaft and in such time relation to the movement of the link that the spring loading operation takes place after the driver operating plunger has been retracted and latched in reset position, and means responsive to the movement of the cocking plunger for unlatching the driver operating plunger upon completion of the spring loading operation.

8. In a fastening inserting machine having a power-driven rotary shaft for actuating a driver operating mechanism, the combination with a reciprocable driver movable in one direction to effect an impact stroke and a spring for operating the driver on said stroke, of reset means operatively connected to the rotary shaft for moving the driver in the opposite direction into retracted position, releasable means for latching the driver in retracted position preparatory to the compression of the spring, and means for first compressing the spring against the latched driver and then releasing the latched driver, said last-mentioned means being actuated by the rotary shaft in time relation to the operation of the reset means so that the spring is not compressed until after the driver has been retracted.

9. In a fastening inserting machine having a power-driven rotary shaft, driver operating mechanism comprising a housing, a reciprocable driver in the housing, a spring for moving the driver in the direction of its impact stroke, means actuated by said shaft for compressing the spring, a latch for holding the driver against movement while the spring is being compressed, said latch being released from the driver by engagement with said means upon sufficient compression of the spring, and a mechanical linkage driven by said shaft for retracting the driver in the opposite direction into engagement with said latch preparatory to the actuation of the means for compressing the spring.

ROBERT H. BLISS.

References Cited in the file of this patent
UNITED STATES PATENTS

| Number | Name | Date |
|---|---|---|
| 2,482,993 | Walker | Sept. 27, 1949 |